United States Patent [19]
Adams

[11] 3,751,234
[45] Aug. 7, 1973

[54] FUEL OIL SLUDGE DISPERSANT COMPOSITION

[75] Inventor: Alan Douglas Adams, Newark, Del.

[73] Assignee: Atlas Chemical Industries, Inc., Wilmington, Del.

[22] Filed: Feb. 2, 1971

[21] Appl. No.: 112,065

[52] U.S. Cl. .................................. 44/66, 44/71
[51] Int. Cl. ................................. C10l 1/22
[58] Field of Search ............. 44/66, 71; 260/413

[56] References Cited
UNITED STATES PATENTS

| | | | |
|---|---|---|---|
| 2,849,301 | 8/1958 | Gee | 44/66 |
| 3,060,210 | 10/1962 | DeGroate et al. | 44/66 |

*Primary Examiner*—Daniel E. Wyman
*Assistant Examiner*—Mrs. Y. H. Smith
*Attorney*—Kenneth E. Mulford and Roger R. Horton

[57] ABSTRACT

Sludges which normally form in fuel oil are maintained in a suspended state by the addition of a sludge dispersant composition comprising a partially esterified polyethoxylated or propoxylated aniline-formaldehyde resin having low molecular weight.

7 Claims, No Drawings

FUEL OIL SLUDGE DISPERSANT COMPOSITION

This invention relates to distillate fuel oil additive compositions and mixtures containing straight run fuel oils which if untreated gradually oxidize or otherwise decompose during storage to form insoluble sludge and sediment which are often responsible for the subsequent clogging of fuel lines, filters, and passageways in engines and burner systems through which such fuels pass. When such plugging occurs, the system ceases to operate or reduces operating efficiency to the point where the engine or burner must be shut down for cleaning.

A problem which often arises from burning fuel oils containing additives is the accumulation of an ash deposit on the surfaces of the combustion chamber which must be periodically removed. A significant advantage offered by the additives of this invention is that they burn clean and leave no ash deposit within the combustion chamber.

The deterioration of distillate fuel oils on storage and the subsequent formation of both soluble and insoluble residues has been recognized for some time. But the mechanism by which these sludges are formed is not clearly understood. It is believed, however, to be associated with oxidation and the polymerization of free radicals that are thereby formed. Incorporation of antioxidants is not successful in stabilizing fuel oil fractions of petroleum distillate as it is in others such as gasolines, greases, lubricating oils, or in rubber products.

It is the primary object of the invention to provide a process for treating fuel oils such that sludge forming materials are maintained in suspension.

It is also the object of the present invention to provide an improved dispersant-petroleum distillate composition which when incorporated at high dilution with petroleum distillate fuel oils overcomes all the difficulties enumerated above.

Another object is to provide a fuel oil composition in which sludge forming materials remain suspended over long periods of time.

These objectives are attained by the surfactants of the invention which act to stabilize any sludge forming ingredients and to prevent their agglomeration. Therefore, such sediments are held in a finely divided state and are capable of passing through filter screens into the combustion chamber where they burn cleanly leaving no ash deposit.

Fuel oil compositions of this invention can be described as fatty acid esters and salts of N,N polyoxyethylene or polyoxypropylene derivatives of aniline made by condensing from 2 – 8 mols of ethylene oxide or propylene oxide with aniline and thereafter condensing formaldehyde with the aniline derivative in mol ratios of 2:3 to 1:1 (mols formaldehyde/mols aniline) in the presence of strong acid. The fatty acid esters of the resin can then be made by the condensation with sufficient acid to neutralize the basic portions in the polyether side chains. Salts of these esters are then made by reacting low molecular weight acids such as acetic to form ammonium salts of the esterified resin. Mixed esters of the resin condensate are made by either a stepwise condensation with various acids or by a simultaneous esterification with a mixture of acids. Normally, the esterified product is made by first condensing the resin with selected acids at high temperatures and thereafter with other selected acids at lower temperatures to make the ammonium salt. Esters of saturated and unsaturated fatty acids having 10 to 20 carbon atoms are useful; however, esters of oleic acid are preferred. While in other cases half of the basic sites in the resin are neutralized with higher molecular weight acids, the remainder including the amine site can be neutralized with lower molecular weight organic acids having from 2 to 10 carbon atoms.

For the purpose of this invention, an ester formed by reacting sufficient acid with the resin to neutralize half of the available basic sites in the resin would be designated the half ester; while a composition made by condensing 1 mol of aniline with 3 mols of propylene oxide to form a resin with formaldehyde in molar ratios of 2 mols of formaldehyde per 3 mols of aniline derivative followed by the half esterification with palmitic acid would be designated polyoxypropylene (3)-aniline formaldelhyde (3:2) half palmitate.

A better understanding of the preparation and use of these additives can be gained through the following illustrative examples and tests:

EXAMPLE 1

POE (2.5) Aniline Formaldehyde(1:1)Half Oleate 4.16 mols of polyoxyethylene (2.5) aniline made by condensing aniline with 2.5 mols of ethylene oxide under pressure in an autoclave is mixed with 4.16 mols of formaldehyde in the form of paraformaldehyde in a stirred and cooled reactor. To this mixture is added 3.1 mols of concentrated hydrochloric acid in small portions sufficiently slow such that the temperature of the mix does not exceed 50°C. The mixture is heated to 75°C. to initiate a reaction which proceeds for 10 hours at 75° – 88°C. with additional heat. The mixture is then cooled and mixed with 3.08 mols of concentrated sodium hydroxide in order to neutralize the hydrochloric acid and the resinous material is thereafter separated. The polymer is washed with hot water (60° – 90°C.) until essentially chloride-free. The polymer is then again heated to 106°C. at 0.6 mm. mercury Hg to remove volatiles. The equivalent weight of this material is determined to be 115.

771 grams (6.7 equivalents) of this material are mixed with 946 grams (3.35 equivalents) of oleic acid and heated to 185° – 195°C. for 3 hours with stirring under a nitrogen blanket. The neutral equivalent weight of this material was determined with hydrochloric acid to be 484 grams.

A dispersant composition, readily dispersible in petroleum distillate fuels at high dilution, is then prepared by incorporating the half oleate in No. 2 fuel oil, kerosene, or other petroleum distillate product at a concentration of 5 grams per 100 mls. and higher. A stock solution of 5 grams per 100 mls. (5% v/w) in No. 2 fuel oil is used as a carrier in the following tests.

EXAMPLE 2

Acetate Salt of POE(2.5)Aniline Formaldehyde (1:1)Half Oleate

Into 100 grams (0.209 $H^+$ equivalents) of the half oleate of Example 1 heated to a temperature of 50° – 60°C. is added 11.5 mls. of 17.4 N acetic acid with stirring. The salt is then heated to 100°C. at 0.5 mm. Hg pressure to remove water.

A stock solution of 5 grams per 100 mls. (5% w/v) in No. 2 fuel oil is used as the carrier in the following tests.

Higher concentrations of the salt in petroleum distillates are useful when large quantities of the materials are to be stored or shipped.

A petroleum distillate fuel oil stabilized against the deposition of sludge upon storage is prepared by adding 3 mls. of the stock solution of Example 1 or 2 per liter of No. 2 fuel oil to yield a composition containing 0.015 grams of the additive per 100 mls. of the oil. Higher and lower concentrations from at least 0.001 grams up to 0.020 per 100 mls. (0.8 grams per gallon) (1 oz./barrel) are made by diluting stock solutions or by adding a mixed salt directly to the fuel oil to be stabilized.

As shown in Table I, other compositions described as additives of the invention above can be added to fuel oils in concentration designated in Column 2 of the Table to give pump flow results as indicated in Column 3. These pumping test results simulate conditions encountered over long storage periods with fuel oil products.

PUMPING TEST

The effectiveness of the additives is demonstrated in a test apparatus comprising a reservoir with agitator from which an oil is recycled in series through a water trap, a filter, a pump, and a standard nozzle return outlet. The equipment is also provided with a pressure gauge and means for controlling the pressure in the line. In this apparatus two-gallon portions of untreated No. 2 fuel oil or kerosene are treated with sufficient quantities of the dispersant composition stock solution of Example 1 to yield the concentrations indicated in Table I. To the treated oil are then added synthetic sludge designated K–801 provided by the Baltimore Paint and Color Company to adjust the concentration of the oil mix to 0.06 mls. per 99.14 mls. and 66 mls. of a synthetic rust slurry prepared by separately dissolving 20.32 gms. of ferric chloride-6 hydrate and 16.04 gms. of ferrous chloride-4 hydrate in 600 ml. portions of tap water, mixing these together and adding to this solution 200 mls. of a water solution containing 15.5 gms. of sodium hydroxide, diluting to 2,000 mls. with water and ageing for 1 week. The contents of the reservoir are agitated for 2 minutes during the addition of the sludge and rust slurry.

A felt filter having a permeability for No. 2 fuel oil of 530 ±30 mls. per minute under a hydrostatic head of 18 inches is placed in the filter holder. The test is run for a total period of 3 hours with the circulating pump pulling the oil from the reservoir through the filter and back to the reservoir. At the end of 1 hour of circulation and also after 2 hours, the flow through the filter is measured at a hydrostatic head pressure of 18 inches and is compared with the initial flow of clean No. 2 fuel oil. Each time, an additional charge of additive, sludge, and rust slurry equivalent to that used originally is placed in the reservoir as described. After one additional hour of circulation, the flow is again measured at the 18-inch hydrostatic head pressure. The results are expressed in Table I for the several concentrations tested, as percentages of the flow rate of clean No. fuel oil. The results in the Table are compared with fuel oil having no additive.

TABLE I

| Example | Additive | Concentration gms./100 mls. | Pump Test (3 hr.) % Flow* |
|---|---|---|---|
| 1 | POE(2.5)Aniline Formaldehyde (1:1)Half Oleate | 0.013 0.0065 | 92 61 |
| 2 | POE(2.5)Aniline Formaldehyde (1:1)Half Oleate Acetate | 0.013 | 65 |
| 3 | POE(6)Aniline Formaldehyde (1:1)Half Oleate | 0.013 | 69 |
| 4 | POE(6)Aniline Formaldehyde (3:2)Half Oleate Acetate | 0.013 0.0065 | 77 71 |
| 5 | POE(6)Aniline Formaldehyde (1:1)Half Oleate Acetate | 0.013 | 75 |
| 6 | POE(6)Aniline Formaldehyde (3:2)Half Oleate | 0.013 | 73 |
| Control A | Untreated Fuel Oil | 0.000 | 14 |

* % Flow = Final Flow × 100/Initial Flow

What is claimed is:

1. A fuel oil sludge dispersant which comprises a petroleum distillate having incorporated therein an additive selected from the group consisting of partial fatty acid esters of polyoxyalkylenated aniline-formaldehyde resins made by the condensation of N,N polyoxyethylenated or polyoxypropylenated aniline having from 2 – 8 alkoxy groups per mol with formaldehyde in mol ratios of 2:3 – 1:1 calculated as mols formaldehyde per mols aniline and thereafter esterifying about 50 percent of the free hydroxyl groups of said condensate with fatty acids having 10 – 20 carbon atoms; and ammonium salts thereof made by reacting the esterified resin with acetic acid.

2. A dispersant of claim 1 wherein said fatty acid is oleic acid.

3. A dispersant of claim 1 wherein said ammonium salt is formed by reacting said resin with acetic acid.

4. A dispersant of claim 1 having 2.5 ethoxy groups per mol of aniline.

5. A petroleum distillate fuel oil having incorporated therein from 0.001 to 0.02 grams per 100 mls. of said fuel oil of dispersants selected from the group consisting of partial fatty acid esters of polyoxyalkylated aniline-formaldehyde resins made by the condensation of N,N polyoxyethylenated or polyoxypropylenated aniline having from 2 – 8 alkoxy groups per mol with formaldehyde in mol ratios of 2:3 – 1:1 calculated as mols formaldehyde per mols aniline and thereafter esterifying about 50 percent of the free hydroxyl groups of said condensate with fatty acids having 10 – 20 carbon atoms; and ammonium salts thereof made by reacting the esterified resin with acetic acid.

6. A petroleum distillate fuel oil of claim 5 wherein said resin has 2.5 ethoxy groups per mol, a formaldehyde-aniline ratio of 1:1, and wherein said fatty acid is oleic.

7. A petroleum distillate fuel oil of claim 5 having incorporated therein from 0.003 to 0.15 grams of said dispersant per 100 mls. of said fuel oil.

* * * * *